(12) United States Patent
Agrawal et al.

(10) Patent No.: US 8,644,691 B1
(45) Date of Patent: Feb. 4, 2014

(54) ADAPTIVELY AND ACCURATELY SEEKING A VIDEO FRAME OF A VIDEO SEQUENCE RENDERED ON A DATA PROCESSING DEVICE

(71) Applicants: Yogesh Subhash Agrawal, Maharashtra (IN); Parag Dileep Mehendale, Pune (IN)

(72) Inventors: Yogesh Subhash Agrawal, Maharashtra (IN); Parag Dileep Mehendale, Pune (IN)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 13/688,256

(22) Filed: Nov. 29, 2012

(51) Int. Cl.
*H04N 5/783* (2006.01)

(52) U.S. Cl.
USPC .......................................... 386/343; 386/353

(58) Field of Classification Search
USPC .................. 386/200, 343, 346, 355
See application file for complete search history.

(56) References Cited

U.S. PATENT DOCUMENTS

| | | | |
|---|---|---|---|
| 5,799,129 A * | 8/1998 | Muto | 386/329 |
| 5,828,370 A | 10/1998 | Moeller et al. | |
| 7,174,561 B2 | 2/2007 | Bixby et al. | |
| 7,869,505 B2 | 1/2011 | Rodriguez et al. | |
| 2004/0252970 A1 | 12/2004 | Noh et al. | |
| 2005/0141861 A1 * | 6/2005 | Dunbar et al. | 386/68 |
| 2010/0166056 A1 | 7/2010 | Perlman et al. | |

FOREIGN PATENT DOCUMENTS

WO 2006078109 A1 7/2006

OTHER PUBLICATIONS http://www.tr.ietejournals.org/article.asp?issn=0256-4602;year=2011;volume=28;issue=;spage=146;epage=157;aulast=Ram%EDrez-Acosta.

* cited by examiner

*Primary Examiner* — Huy T Nguyen
(74) *Attorney, Agent, or Firm* — Raj Abhyanker, P.C.

(57) ABSTRACT

A method includes initiating, through an interface of a multimedia application executing on a data processing device, seeking of a desired frame of a video sequence rendered thereon. The desired frame corresponds to a desired point in time. The method also includes causing, through a set of instructions associated with a processor of the data processing device and/or an operating system executing thereon, the processor to decode frames of the video sequence from a closest frame in a temporal past relative to the desired frame following the initiation. Further, the method includes rendering, through the processor and on the interface, frames of the video sequence after a predeterminable threshold time period at a lower frame rate than a frame rate of the video sequence otherwise at least until the desired frame is decoded and rendered when the desired frame is not decoded within the predeterminable threshold time period.

20 Claims, 9 Drawing Sheets

| FRAME RATE (FPS) | FRAME COUNT |
| --- | --- |
| < 24 | 0 |
| 24 | 1 |
| 30 | 1 |
| 60 | 2 |
| 90 | 3 |
| 120 | 4 |

TABLE 600

FIGURE 6

ADAPTIVELY AND ACCURATELY SEEKING A VIDEO FRAME OF A VIDEO SEQUENCE RENDERED ON A DATA PROCESSING DEVICE

FIELD OF TECHNOLOGY

This disclosure relates generally to data processing devices and, more particularly, to adaptively and accurately seeking a video frame of a video sequence rendered on a data processing device.

BACKGROUND

A data processing device (e.g., a personal computer, a laptop computer, a notebook computer, a mobile device such as a mobile phone) may have video files stored therein. The video files may be rendered on a user interface of a multimedia application (e.g., Windows Media Player®) on the data processing device. A user of the data processing device may want to skip to a different point in time of a video sequence associated with a video file during rendering thereof. When the user initiates the skip, a desired video frame may not be present at the actual point in time. Therefore, the video sequence may resume either before or after the actual point in time desired.

An accurate seek process may ensure that the video sequence resumes from the desired point in time. As part of the aforementioned process, a video frame in a temporal past relative to the desired point in time may be chosen and decoding may start from the aforementioned chosen frame. Here, none of the video frames may be rendered until the desired point in time is reached, thereby contributing to a lengthened process. A time required to accomplish the accurate seek may be entirely dependent on a position of the video frame in the temporal past. Therefore, the accurate seek process may be unreliable.

SUMMARY

Disclosed are a method, a device and/or a system of adaptively and accurately seeking a video frame of a video sequence rendered on a data processing device.

In one aspect, a method includes initiating, through an interface of a multimedia application executing on a data processing device, seeking of a desired frame of a video sequence rendered on the interface. The desired frame corresponds to a desired point in time. The method also includes causing, through a set of instructions associated with a processor of the data processing device communicatively coupled to a memory thereof and/or an operating system executing on the data processing device, the processor to decode frames of the video sequence from a closest frame in a temporal past relative to the desired frame following the initiation of the seeking of the desired frame. Further, the method includes rendering, through the processor and on the interface, frames of the video sequence after a predeterminable threshold time period at a lower frame rate than a frame rate of the video sequence otherwise at least until the desired frame is decoded and rendered when the desired frame is not decoded within the predeterminable threshold time period.

In another aspect, a non-transitory medium, readable through a data processing device and comprising instructions embodied therein that are executable through the data processing device, is disclosed. The non-transitory medium includes instructions to initiate, through an interface of a multimedia application executing on the data processing device, seeking of a desired frame of a video sequence rendered on the interface. The desired frame corresponds to a desired point in time. The non-transitory medium also includes instructions to cause, through a set of instructions associated with a processor of the data processing device communicatively coupled to a memory thereof and/or an operating system executing on the data processing device, the processor to decode frames of the video sequence from a closest frame in a temporal past relative to the desired frame following the initiation of the seeking of the desired frame.

Further, the non-transitory medium includes instructions to render, through the processor and on the interface, frames of the video sequence after a predeterminable threshold time period at a lower frame rate than a frame rate of the video sequence otherwise at least until the desired frame is decoded and rendered when the desired frame is not decoded within the predeterminable threshold time period.

In yet another aspect, a data processing device includes a memory including a video file therein, a processor communicatively coupled to the memory, and an interface of a multimedia application executing on the data processing device to enable initiation of seeking of a desired frame of a video sequence related to the video file when rendered thereon. The desired frame corresponds to a desired point in time. The data processing device also includes a driver component associated with the processor. The driver component and/or an operating system executing on the data processing device are configured to cause the processor to decode frames of the video sequence from a closest frame in a temporal past relative to the desired frame following the initiation of the seeking of the desired frame.

The processor is further configured to render on the interface, frames of the video sequence after a predeterminable threshold time period at a lower frame rate than a frame rate of the video sequence otherwise at least until the desired frame is decoded and rendered when the desired frame is not decoded within the predeterminable threshold time period.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 6 is an example table including frame counts corresponding to frame rates to be utilized in the adaptive accurate seek process of FIG. 4.

Other features of the present embodiments will be apparent from the accompanying drawings and from the detailed description that follows.

DETAILED DESCRIPTION

Example embodiments, as described below, may be used to provide a method, a device and/or a system of adaptively and accurately seeking a video frame of a video sequence rendered on a data processing device. Although the present embodiments have been described with reference to specific example embodiments, it will be evident that various modifications and changes may be made to these embodiments without departing from the broader spirit and scope of the various embodiments.

Figure 1:
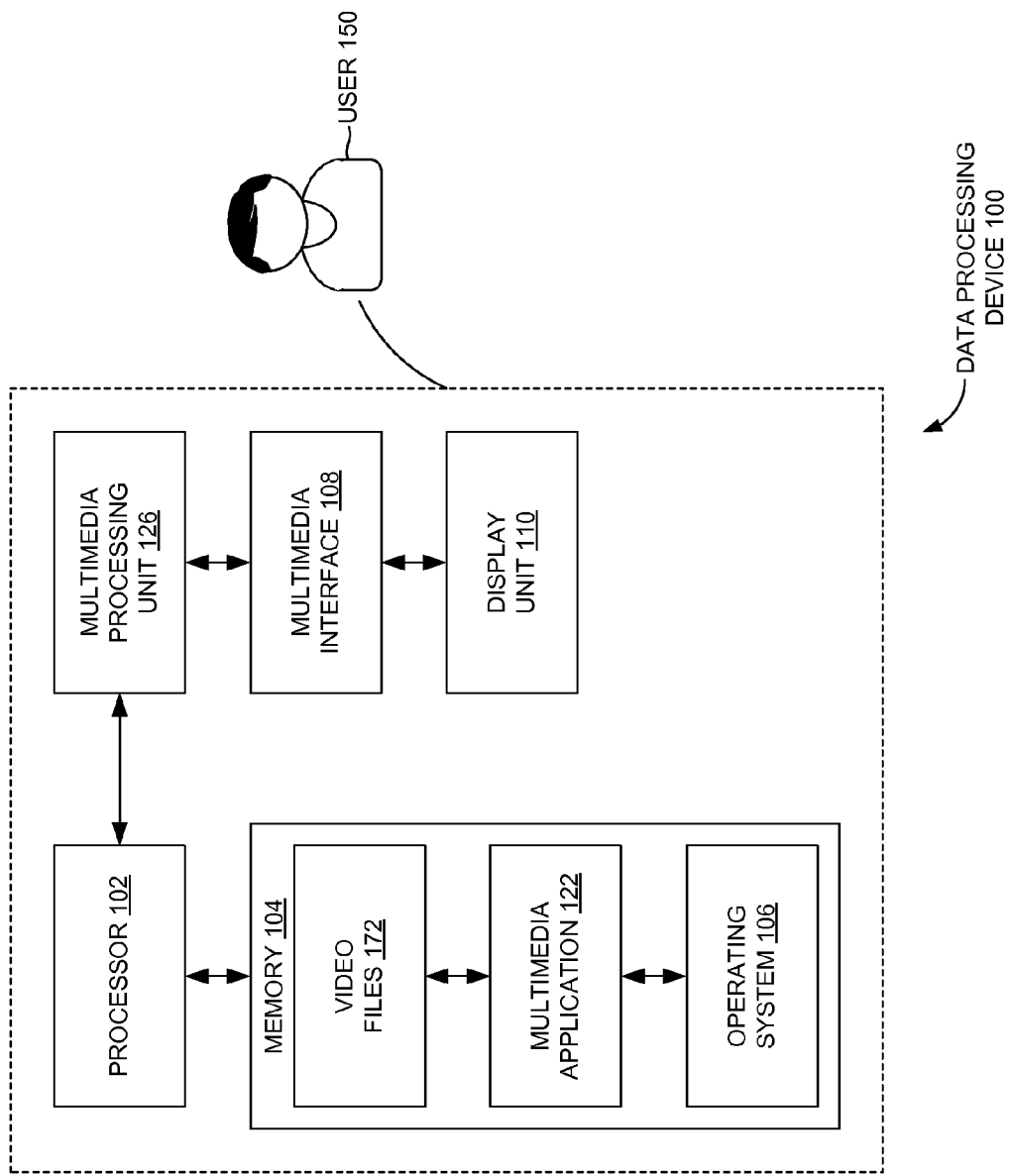
FIG. 1 is a schematic view of a data processing device, according to one or more embodiments.

FIG. 1 shows a data processing device 100, according to one or more embodiments. An example data processing device 100 may include but is not limited to a desktop computer, a laptop computer, a notebook computer, a tablet and a mobile device such as a mobile phone. In one or more embodiments, data processing device 100 may include a processor 102 (e.g., Central Processing Unit (CPU), Graphics Processing Unit (GPU)) communicatively coupled to a memory 104, processor 102 being configured to address storage locations in memory 104. In one or more embodiments, memory 104 may include a volatile memory (e.g., Random Access Memory (RAM)) and/or a non-volatile memory (e.g., Read-Only Memory (ROM), hard disk).

In one or more embodiments, output data associated with processing through processor 102 may be input to a multimedia processing unit 126 configured to perform encoding/decoding associated with the data. In one or more embodiments, the output of multimedia processing unit 126 may be rendered on a display unit 110 (e.g., Liquid Crystal Display (LCD) display, Cathode Ray Tube (CRT) monitor) through a multimedia interface 108 configured to convert data to an appropriate format required by display unit 110.

It is obvious that an operating system 106 may execute on data processing device 100. FIG. 1 shows operating system 106 as being stored in memory 104 (e.g., non-volatile memory). In one or more embodiments, data processing device 100 may execute a multimedia application 122 (e.g., Windows Media Player®) on processor 102; FIG. 1 shows multimedia application 122 as being stored in memory 104 to be executed on processor 102. In one or more embodiments, multimedia application 122 may utilize an Application Programming Interface (API) of a multimedia framework (to be discussed with regard to FIG. 2) in order to execute processing associated therewith.

Figure 2:
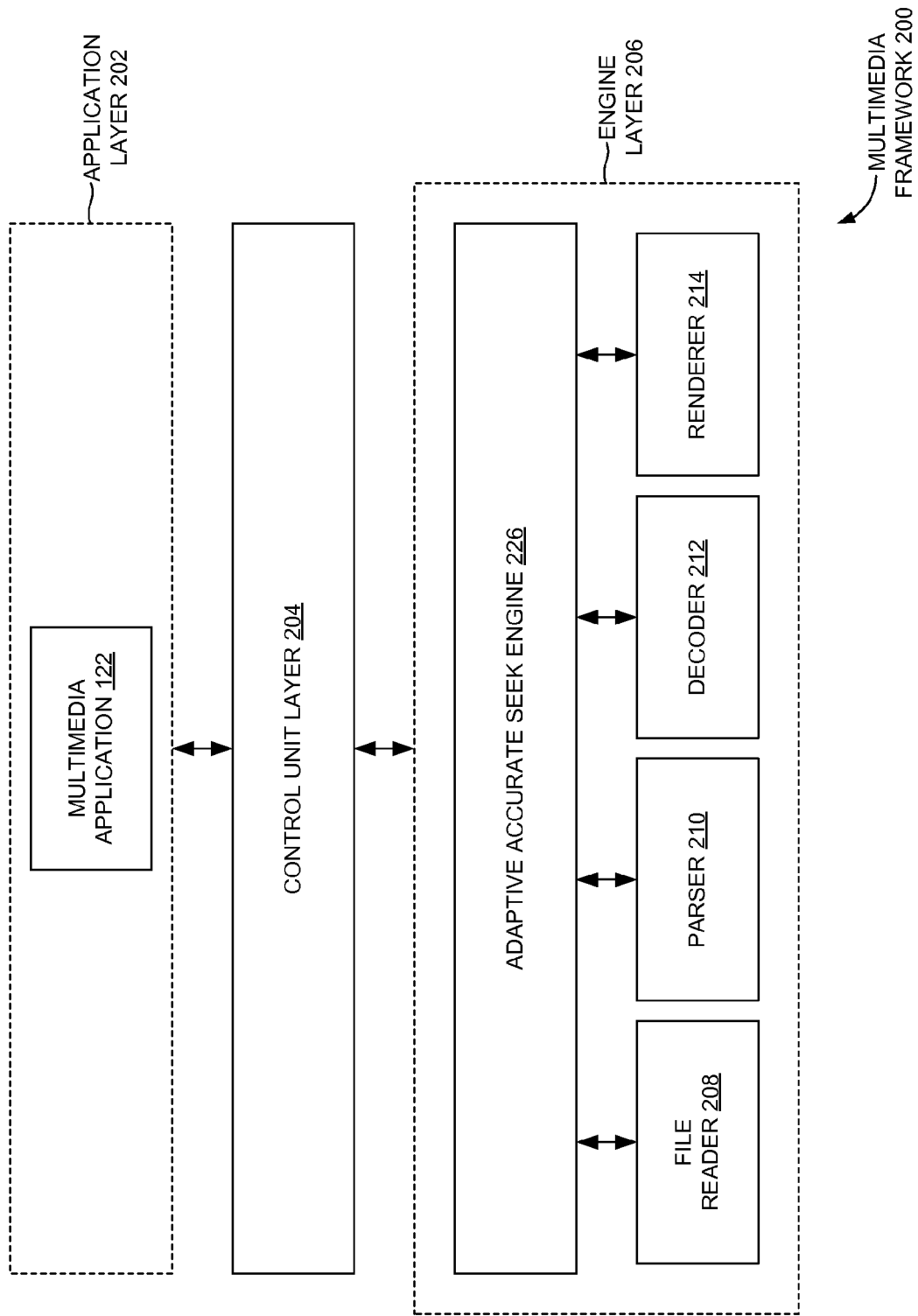
FIG. 2 is a schematic view of a multimedia framework implemented in the data processing device of FIG. 1, according to one or more embodiments.

FIG. 2 shows a multimedia framework 200 implemented in data processing device 100, according to one or more embodiments. In one or more embodiments, multimedia framework 200 may provide multimedia capture, processing and/or playback facilities utilizing local or remote sources. In one or more embodiments, multimedia framework 200 may be above a foundation layer that facilities access of hardware such as a soundcard. In one or more embodiments, multimedia framework 200 may include an application layer 202 configured to communicate with a control unit layer 204 to enable performing a task required by multimedia application 122. Thus, multimedia application 122 may be at a level of application layer 202. In one or more embodiments, control unit layer 204 may control dataflow through engines (or, modules; shown as part of engine layer 206) of multimedia framework 200 such as file reader 208, parser 210, decoder 212 and renderer 214.

File reader 208 may be configured to enable reading of data (e.g., video file, multimedia file) from a source. Parser 210 (e.g., Moving Picture Experts Group (MPEG) parser, Audio-Video Interleave (AVI) parser) may parse a stream of the data into constituent parts thereof. Decoder 212 may decode a compressed or an encoded version of the data and renderer 214 may transmit the decoded data to a destination (e.g., a rendering device). The rendering process may also include processes such as displaying multimedia on display unit 110, playing an audio file on a soundcard, writing the data to a file etc. It is obvious that the aforementioned engines (or, modules) are merely shown for illustrative purposes and that variations therein are within the scope of the exemplary embodiments.

Figure 3:
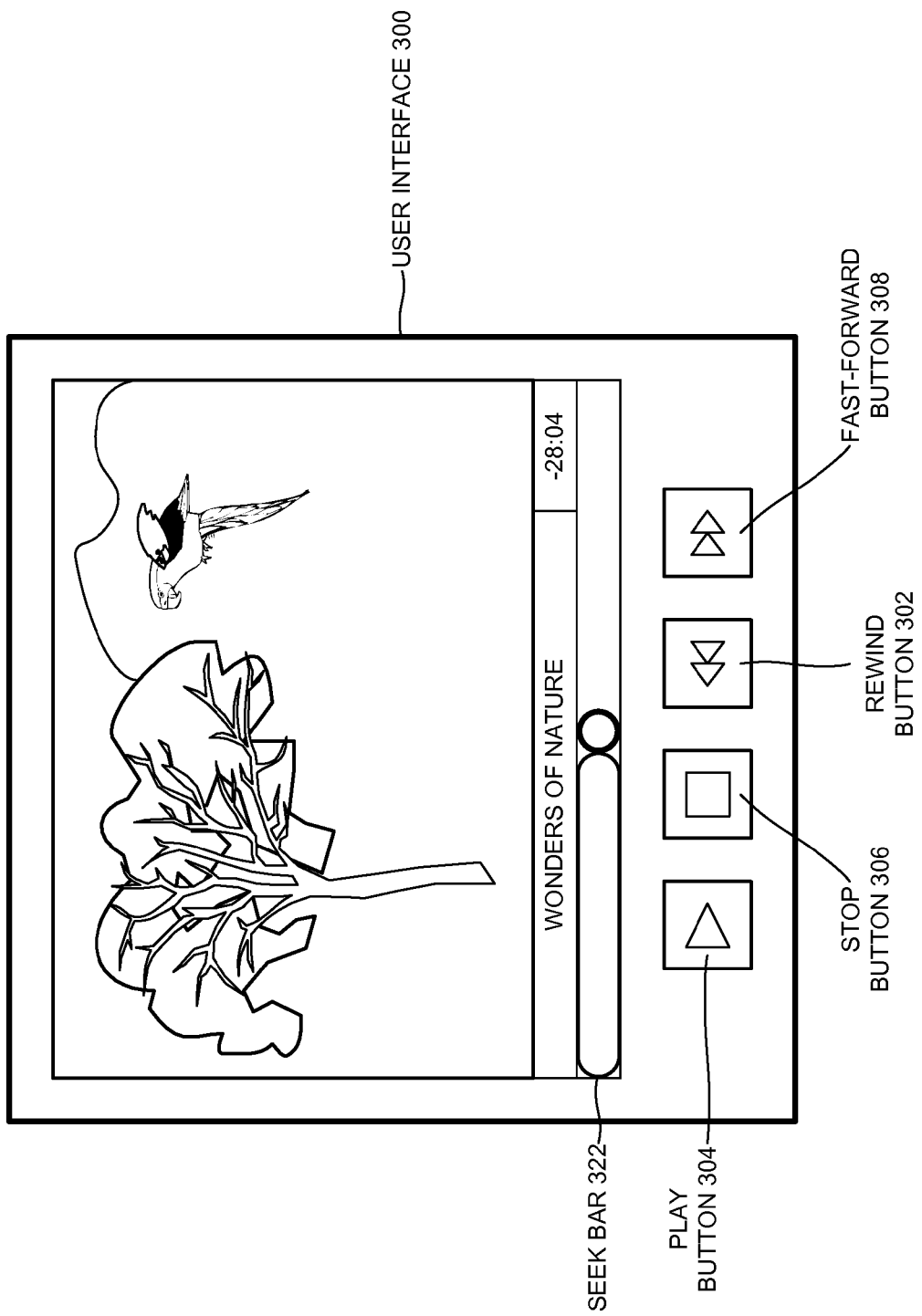
FIG. 3 is a schematic view of a user interface of a multimedia application executing on the data processing device of FIG. 1, according to one or more embodiments.

FIG. 3 shows a user interface 300 of multimedia application 122, according to one or more embodiments. In one or more embodiments, user interface 300 may include a rewind button 302, a play button 304, a stop button 306, and a fast-forward button 308. The aforementioned buttons are self-explanatory. In one or more embodiments, multimedia application 122 may transmit events related to action(s) (e.g., clicking rewind button 302, stop button 306) performed by user 150 on user interface 300 to multimedia framework 200. In one or more embodiments, user interface 300 may also include a seek bar 322 to indicate progress of a video sequence during rendering thereof. For example, user 150 may load a video file (e.g., video file 172 shown in FIG. 1) on user interface 300. Here, user 150 may move seek bar 322 to any desired point in time of the duration of the video sequence corresponding to the video file.

Further, FIG. 2 shows an adaptive accurate seek engine 226 (e.g., a software engine) to control other engines of engine layer 206. In one or more embodiments, once user 150 moves seek bar 322 to a desired point in time of a video sequence, adaptive accurate seek engine 226 may cause decoder 212 to decode frames of the video sequence from a closest frame in a temporal past relative to a frame corresponding to the desired point in time. In one or more embodiments, if the frame corresponding to the desired point in time is not decoded within a threshold time period (e.g., 300 ms) that can be predetermined, then adaptive accurate seek engine 226 may cause adaptive accurate seek to be triggered. In one or more embodiments, as part of the adaptive accurate seek process, decoder 212 may start rendering frames after the threshold frame time; however, the rendering may occur at a lower frame rate as discussed below.

Figure 4:
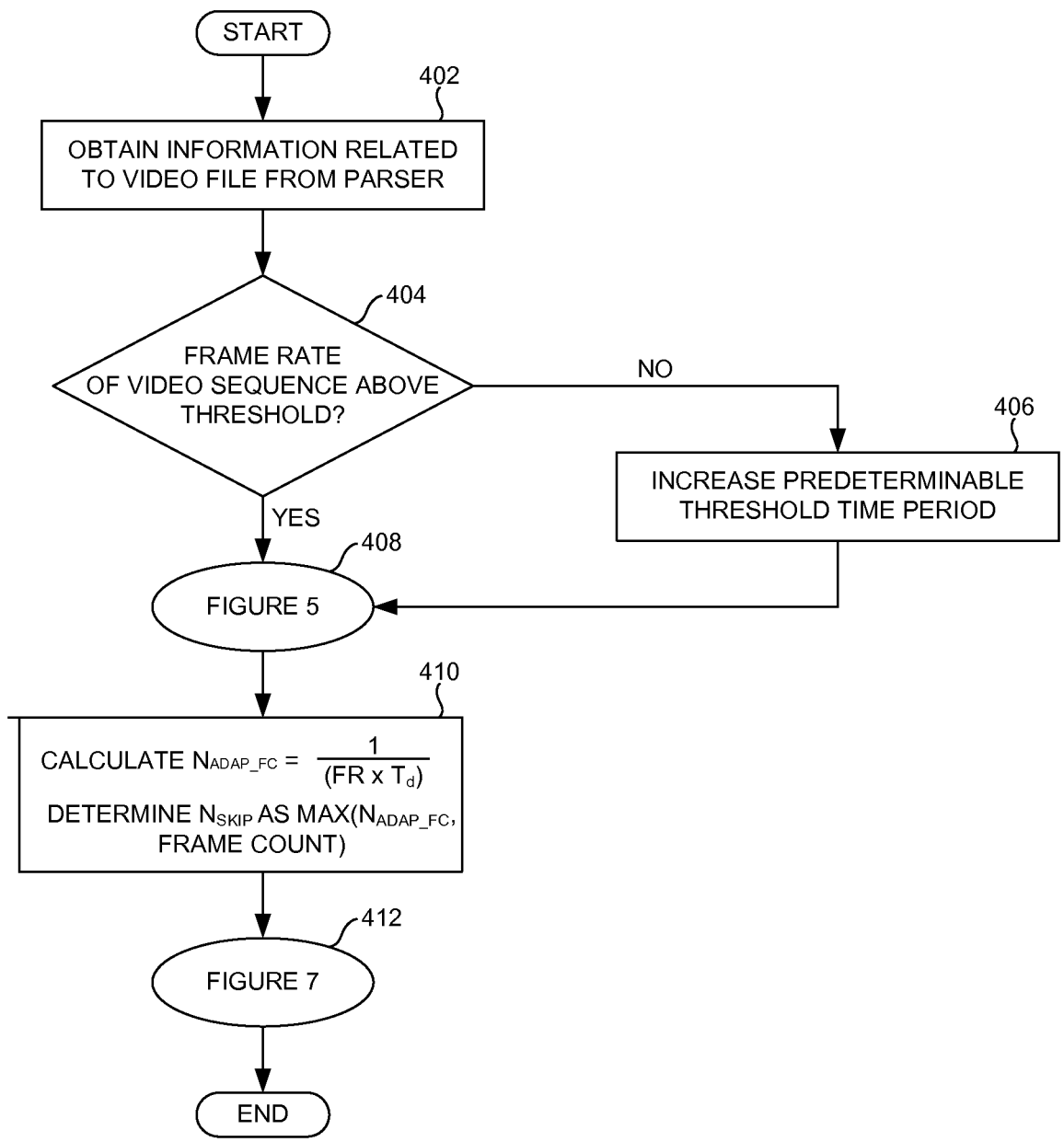
FIG. 4 is a flowchart detailing the operations involved in an adaptive accurate seek process of a video frame of a video sequence rendered on the data processing device of FIG. 1, according to one or more embodiments.
Figure 5:
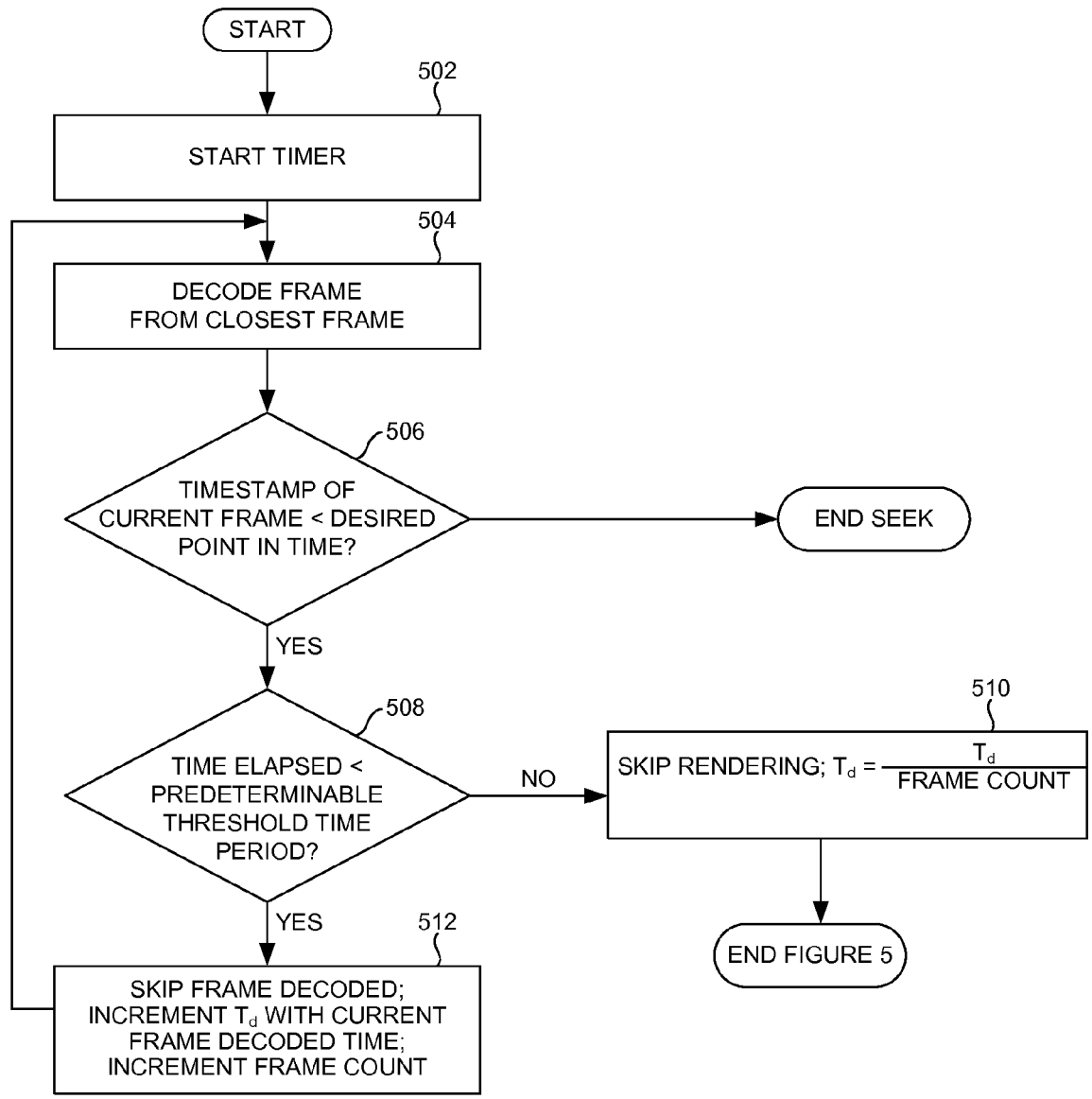
FIG. 5 is a flowchart detailing the operations involved in a sub-process of the adaptive accurate seek process of FIG. 4.

FIG. 4 shows a flowchart summarizing the adaptive accurate seek process, according to one or more embodiments. In one or more embodiments, operation 402 may involve obtaining information related to the video file from parser 210. For example, a test script (e.g., a set of instructions) executed through processor 102 may obtain the requisite information. In one or more embodiments, operation 404 may involve checking (e.g., through processor 102) as to whether the frame rate of the video sequence is above a threshold (e.g., 24 frames per second (fps)). In one or embodiments, if no, operation 406 may involve increasing the predeterminable threshold time period (e.g., by three times) to increase the possibility of decoding the frame corresponding to the desired point in time. In one or more embodiments, control may then proceed to operation 408. In one or more embodiments, if yes, operations involved in the process may proceed as shown in FIG. 5 (indicated as operation 408). FIG. 5 may denote a sub-process of FIG. 4. In one or more embodiments, operation 502 may involve starting a timer (e.g., through processor 102); operation 504 may then involve beginning decoding of frames from the closest frame corresponding to the temporal past of the desired point in time.

In one or more embodiments, operation 506 may involve checking (e.g., through processor 102) as to whether the timestamp of a current frame encountered corresponds to a time that is less than the desired point in time. In one or more embodiments, if no, the seek process may be ended. In one or more embodiments, if yes, operation 508 may involve checking as to whether the time elapsed (based on the timer) is less than the predeterminable threshold time period. In one or more embodiments, if the result of operation 508 is a no, operation 510 may involve skipping rendering of the decoded frame and setting the time taken to decode the other one or more frame(s) ($T_d$; $T_d$ can also be seen as the time spent in decoding the frame corresponding to the desired point in time) as the time taken to decode the other one or more frame(s) divided by a frame count that corresponds to the frame rate. In one or more embodiments, the aforementioned frame count may correspond to the number of frames skipped without rendering following decoding thereof. FIG. 6 shows an example table 600 including the frame count corresponding to the frame rate. The aforementioned table 600, for example, may be stored in memory 104 to be referenced by processor 102.

It is obvious that the abovementioned division of the time taken to decode the one or more other frames by the frame count may serve to average it. In one or more embodiments, if the result of operation 508 is a yes, operation 512 may involve skipping the frame decoded (or, discarding the aforementioned frame) and incrementing the time spent in decoding the frame corresponding to the desired point in time with the current frame decode time. In one or more embodiments, operation 512 may also involve incrementing the frame count discussed above by 1. In one or more embodiments, control may then be passed onto operation 504, where the next frame is decoded and the processes repeated until the frame corresponding to the desired point in time is decoded or the predeterminable threshold time period elapses.

In one or more embodiments, as discussed above, if the frame corresponding to the desired point in time is not decoded within the predeterminable threshold time period, rendering of the frames may be initiated (e.g., through adaptive accurate seek engine 226) after the predeterminable threshold time period; the rendering may, however, be at a lower frame rate. Referring back to FIG. 4, in one or more embodiments, operation 410 may involve calculating the adaptive frame count ($N_{adap\_fc}$; adaptively calculating the number of frames to skip) from $T_d$ (see operation 408) as $N_{adap\_fc}=1/(FR*T_d)$, where FR is the frame rate. In one or more embodiments, operation 410 may also involve determining the frames to skip ($N_{skip}$) as the maximum of $N_{adap\_fc}$ and the frame count obtained from table 600 of FIG. 6 corresponding to FR (or, the frame rate). In one or more embodiments, control may then pass onto operation 412, which may involve sub-processes as described in FIG. 7.

Figure 7:
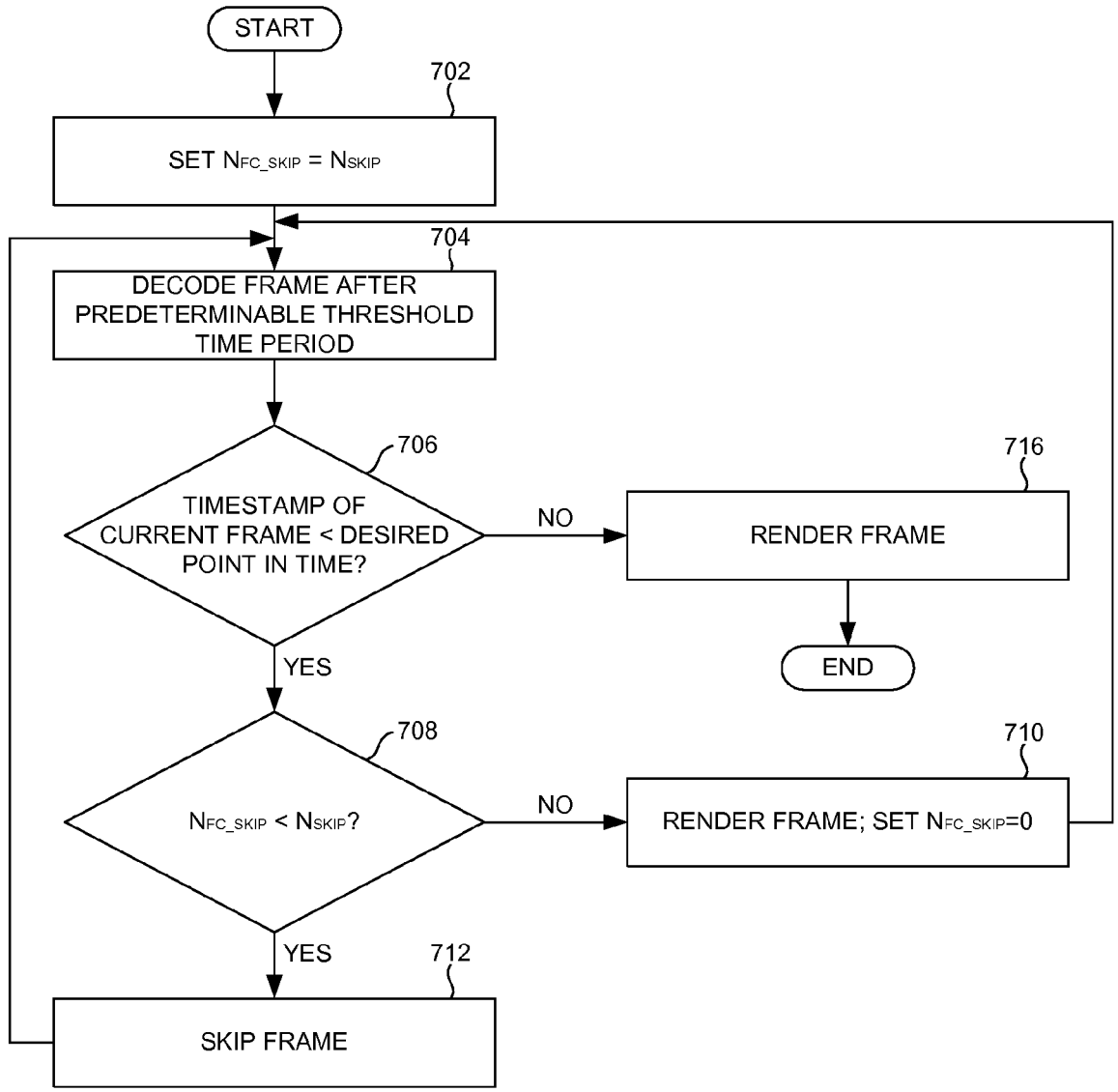
FIG. 7 is a flowchart detailing the operations involved in another sub-process of the adaptive accurate seek process of FIG. 4.

FIG. 7 shows a flowchart of the rendering process of the frames after the frame corresponding to the desired point in time is not decoded within the predeterminable threshold time period. In one or more embodiments, operation 702 may involve setting the skip frame count ($N_{fc\_skp}$) to be equal to $N_{skip}$. Now, in one or more embodiments, operation 704 may involve decoding the frames after the predeterminable threshold time period. In one or more embodiments, operation 706 may involve checking (e.g., through processor 102) as to whether the timestamp of a current frame encountered corresponds to a time that is less than the desired point in time. In one or more embodiments, if no, operation 716 may involve rendering the current decoded frame and ending the accurate seek process; this, obviously, is because there are no other frames to be decoded and rendered.

In one or more embodiments, if the result of operation 706 is a yes, then operation 708 may involve checking as to whether $N_{fc\_skp}$ is less than $N_{skip}$. The aforementioned relation will always be false the first time (see operation 702). In one or more embodiments, if the result of operation 708 is a no, operation 710 may involve rendering the frame, along with setting $N_{fc\_skp}$ to 0. Control may then be passed from operation 710 to operation 704. In one or more embodiments, if the result of operation 708 is yes, operation 712 may then involve skipping the frame (or, discarding the frame) without rendering thereof and moving onto decoding the next frame (control, again, may pass to operation 704). It is obvious that the adaptive accurate seek process may be terminated upon rendering of the frame corresponding to the desired point in time. Further, it is obvious that parameters such as the predeterminable threshold time period (and increase/decrease thereof) and table 600 may be modified based on user (e.g., user 150) experience.

Thus, in one or more embodiments, frames following the predeterminable threshold time period may be rendered at a lower frame rate. In one or more embodiments, the adaptive seek process discussed above may be faster and more reliable than an accurate seek process, where decoding may start from a closest frame in a temporal past relative to the desired point in time but none of the frames would be rendered till the desired point in time is reached. In one or more embodiments, the adaptive seek process discussed above may also be more accurate than a process where a video frame closest to the desired point in time is sought and decoding starts therefrom.

It is obvious that adaptive accurate seek engine 226 may be implemented as a driver component instead of a module or an engine executing on processor 102 (and stored in memory 104 for execution through processor 102). In this case, the moving of seek bar 322 by user 150 may enable the driver component to initiate the adaptive accurate seek process discussed above, in conjunction with processor 102. Other possible variations are within the scope of the exemplary embodiments. Further, user 150 may be provided the option to enable and/or disable the adaptive accurate seek process.

It is obvious that the engines of multimedia framework 200 may be executed through processor 102. The driver component or equivalent software thereof discussed above may be stored in memory 104 to be installed on data processing device 100 after a download through the Internet. Alternately, an external memory may be utilized therefor. Also, instructions associated with the driver component may be embodied on a non-transitory medium readable through data processing device 100 such as a Compact Disc (CD), a Digital Video Disc (DVD), a Blu-ray™ disc, a floppy disk, or a diskette etc. The aforementioned instructions may be executable through data processing device 100.

The set of instructions associated with the driver component or equivalent software thereof is not limited to specific embodiments discussed above, and may, for example, be implemented in operating system 106, an application program (e.g., multimedia application 122), a foreground or a background process, a network stack or any combination thereof. Other variations are within the scope of the exemplary embodiments discussed herein.

Figure 8:
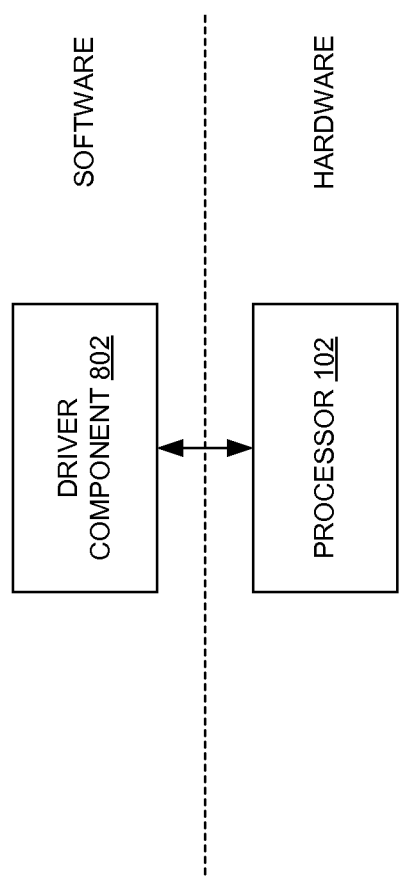
FIG. 8 is a schematic view of interaction between a driver component and a processor of the data processing device of FIG. 1 during the adaptive accurate seek process of FIG. 4.

FIG. 8 shows interaction between a driver component 802 and processor 102 (e.g., GPU) during the adaptive accurate seek process, according to one or more embodiments. In one or more embodiments, when user 150 moves seek bar 322 to initiate the adaptive accurate seek process, driver component 802 may enable processor 102 execute adaptive accurate seek engine 226 and associated engines thereof to obtain desired results discussed above.

Figure 9:
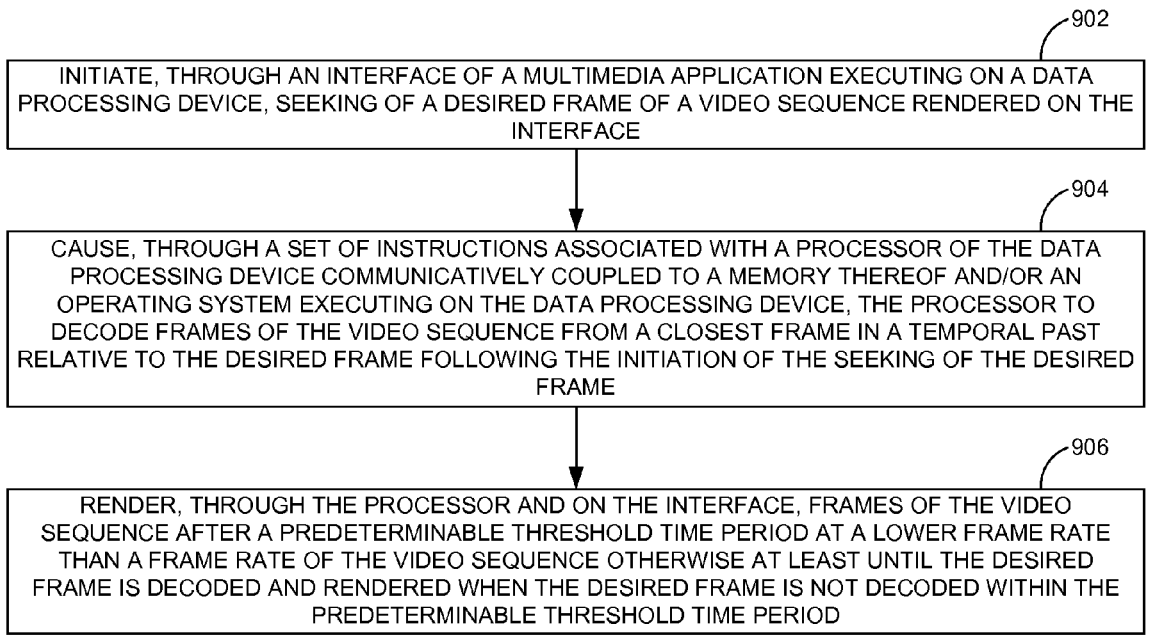
FIG. 9 is a process flow diagram detailing the operations involved in adaptively and accurately seeking a video frame of a video sequence rendered on the data processing device of FIG. 1, according to one or more embodiments.

FIG. 9 shows a process flow diagram detailing the operations involved in adaptively and accurately seeking a video frame of a video sequence rendered on data processing device 100, according to one or more embodiments. In one or more embodiments, operation 902 may involve initiating, through an interface (e.g., user interface 300) of multimedia application 122 executing on data processing device 100, seeking of a desired frame of the video sequence rendered on the interface. In one or more embodiments, the desired frame may correspond to a desired point in time.

In one or more embodiments, operation 904 may involve causing, through a set of instructions associated with processor 102 of data processing device 100 communicatively coupled to memory 104 thereof and/or operating system 106 executing on data processing device 100, processor 102 to decode frames of the video sequence from a closest frame in a temporal past relative to the desired frame following the initiation of the seeking of the desired frame. In one or more embodiments, operation 906 may then involve rendering, through processor 102 and on the interface, frames of the video sequence after a predeterminable threshold time period at a lower frame rate than a frame rate of the video sequence otherwise at least until the desired frame is decoded and rendered when the desired frame is not decoded within the predeterminable threshold time period.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a non-transitory machine-readable medium). For example, the various electrical structure and methods may be embodied using transistors, logic gates, and electrical circuits (e.g., Application Specific Integrated Circuitry (ASIC) and/or Digital Signal Processor (DSP) circuitry).

In addition, it will be appreciated that the various operations, processes, and methods disclosed herein may be embodied in a non-transitory machine-readable medium and/or a machine accessible medium compatible with a data processing system (e.g., data processing device 100), and may be performed in any order (e.g., including using means for achieving the various operations).

Accordingly, the specification and drawings are to be regarded in an illustrative rather than a restrictive sense.

What is claimed is:

1. A method comprising:
    initiating, through an interface of a multimedia application executing on a data processing device, seeking of a desired frame of a video sequence rendered on the interface, the desired frame corresponding to a desired point in time;
    causing, through at least one of a set of instructions associated with a processor of the data processing device communicatively coupled to a memory thereof and an operating system executing on the data processing device, the processor to decode frames of the video sequence from a closest frame in a temporal past relative to the desired frame following the initiation of the seeking of the desired frame; and
    rendering, through the processor and on the interface, frames of the video sequence after a predeterminable threshold time period at a lower frame rate than a frame rate of the video sequence otherwise at least until the desired frame is decoded and rendered when the desired frame is not decoded within the predeterminable threshold time period.

2. The method of claim 1, wherein causing the processor to decode the frames of the video sequence from the closest frame in the temporal past further comprises:
    acquiring information related to the video sequence through the processor; and
    increasing the predeterminable threshold time period if the frame rate of the video sequence is less than a threshold thereof.

3. The method of claim 1, comprising initiating the seeking of the desired frame through moving a seek bar on the interface of the multimedia application.

4. The method of claim 2, further comprising:
    starting, through the processor, a timer;
    ending seeking of the desired frame when a timestamp of a current frame encountered corresponds to a time that is more than the desired point in time;
    determining whether a time elapsed during the decoding is less than the predeterminable threshold time period based on the timer;
    skipping a decoded current frame without rendering when the time elapsed is more than the predeterminable threshold time period and setting a time spent in decoding the desired frame as the time spent in decoding the desired frame divided by a frame count corresponding to the frame rate of the video sequence, the frame count determining a number of decoded frames skipped without rendering thereof; and
    skipping the decoded current frame without rendering, incrementing the time spent in decoding the desired frame with a decode time of the current frame and incrementing the frame count by 1 when the time elapsed is less than the predeterminable threshold time period.

5. The method of claim 4, wherein rendering the frames of the video sequence after the predeterminable threshold time period at the lower frame rate further comprises:
    adaptively calculating a number of frames to skip without rendering thereof from the time spent in decoding the desired frame;
    determining a number of frames to skip without rendering thereof as a maximum of the adaptively calculated number of frames to skip and the frame count corresponding to the frame rate of the video sequence;
    setting a skip frame count to the determined number of frames to skip;

decoding the frames of the video sequence after the predeterminable threshold period;
rendering a decoded frame when a timestamp of the decoded frame corresponds to a time that is more than the desired point in time, followed by termination of the seeking;
rendering the decoded frame along with setting the skip frame count as 0 when the timestamp of the decoded frame corresponds to a time that is less than the desired point in time; and
skipping the decoded frame without rendering and moving onto decoding a next frame when the skip frame count is less than the determined number of frames to skip.

6. The method of claim 1, further comprising:
implementing a multimedia framework in the data processing device;
transmitting, through the multimedia application, an event related to the seeking of the desired frame to the multimedia framework; and
executing processes related to the seeking of the desired frame through the multimedia framework, in conjunction with the processor.

7. The method of claim 1, wherein the set of instructions is part of a driver component.

8. A non-transitory medium, readable through a data processing device and comprising instructions embodied therein that are executable through the data processing device, comprising:
instructions to initiate, through an interface of a multimedia application executing on the data processing device, seeking of a desired frame of a video sequence rendered on the interface, the desired frame corresponding to a desired point in time;
instructions to cause, through at least one of a set of instructions associated with a processor of the data processing device communicatively coupled to a memory thereof and an operating system executing on the data processing device, the processor to decode frames of the video sequence from a closest frame in a temporal past relative to the desired frame following the initiation of the seeking of the desired frame; and
instructions to render, through the processor and on the interface, frames of the video sequence after a predeterminable threshold time period at a lower frame rate than a frame rate of the video sequence otherwise at least until the desired frame is decoded and rendered when the desired frame is not decoded within the predeterminable threshold time period.

9. The non-transitory medium of claim 8, wherein instructions to cause the processor to decode the frames of the video sequence from the closest frame in the temporal past further comprise:
instructions to acquire information related to the video sequence through the processor; and
instructions to increase the predeterminable threshold time period if the frame rate of the video sequence is less than a threshold thereof.

10. The non-transitory medium of claim 8, comprising instructions to initiate the seeking of the desired frame through moving a seek bar on the interface of the multimedia application.

11. The non-transitory medium of claim 9, further comprising instructions to:
start, through the processor, a timer;
end seeking of the desired frame when a timestamp of a current frame encountered corresponds to a time that is more than the desired point in time;
determine whether a time elapsed during the decoding is less than the predeterminable threshold time period based on the timer;
skip a decoded current frame without rendering when the time elapsed is more than the predeterminable threshold time period and set a time spent in decoding the desired frame as the time spent in decoding the desired frame divided by a frame count corresponding to the frame rate of the video sequence, the frame count determining a number of decoded frames skipped without rendering thereof; and
skip the decoded current frame without rendering, increment the time spent in decoding the desired frame with a decode time of the current frame and increment the frame count by 1 when the time elapsed is less than the predeterminable threshold time period.

12. The non-transitory medium of claim 11, wherein instructions to render the frames of the video sequence after the predeterminable threshold time period at the lower frame rate further comprise:
instructions to adaptively calculate a number of frames to skip without rendering thereof from the time spent in decoding the desired frame;
instructions to determine a number of frames to skip without rendering thereof as a maximum of the adaptively calculated number of frames to skip and the frame count corresponding to the frame rate of the video sequence;
instructions to set a skip frame count to the determined number of frames to skip;
instructions to decode the frames of the video sequence after the predeterminable threshold period;
instructions to render a decoded frame when a timestamp of the decoded frame corresponds to a time that is more than the desired point in time, followed by termination of the seeking;
instructions to render the decoded frame along with setting the skip frame count as 0 when the timestamp of the decoded frame corresponds to a time that is less than the desired point in time; and
instructions to skip the decoded frame without rendering and move onto decoding a next frame when the skip frame count is less than the determined number of frames to skip.

13. The non-transitory medium of claim 8, further comprising instructions to:
transmit, through the multimedia application, an event related to the seeking of the desired frame to a multimedia framework implemented in the data processing device; and
execute processes related to the seeking of the desired frame through the multimedia framework, in conjunction with the processor.

14. The non-transitory medium of claim 8, wherein the set of instructions is part of a driver component.

15. A data processing device comprising:
a memory including a video file therein;
a processor communicatively coupled to the memory;
an interface of a multimedia application executing on the data processing device to enable initiation of seeking of a desired frame of a video sequence related to the video file when rendered thereon, the desired frame corresponding to a desired point in time; and
a driver component associated with the processor, at least one of the driver component and an operating system executing on the data processing device being configured to cause the processor to decode frames of the video sequence from a closest frame in a temporal past relative to the desired frame following the initiation of the seeking of the desired frame, and the processor further being configured to render on the interface, frames of the video sequence after a predeterminable threshold time period at a lower frame rate than a frame rate of the video sequence otherwise at least until the desired frame is decoded and rendered when the desired frame is not decoded within the predeterminable threshold time period.

16. The data processing device of claim 15, wherein the processor is configured to decode the frames of the video sequence from the closest frame in the temporal past based on:
   acquiring information related to the video sequence; and
   increasing the predeterminable threshold time period if the frame rate of the video sequence is less than a threshold thereof.

17. The data processing device of claim 15, wherein the seeking of the desired frame is initiated through moving a seek bar on the interface of the multimedia application.

18. The data processing device of claim 16, wherein the processor is further configured to:
   start a timer,
   end seeking of the desired frame when a timestamp of a current frame encountered corresponds to a time that is more than the desired point in time,
   determine whether a time elapsed during the decoding is less than the predeterminable threshold time period based on the timer,
   skip a decoded current frame without rendering when the time elapsed is more than the predeterminable threshold time period and set a time spent in decoding the desired frame as the time spent in decoding the desired frame divided by a frame count corresponding to the frame rate of the video sequence, the frame count determining a number of decoded frames skipped without rendering thereof, and
   skip the decoded current frame without rendering, increment the time spent in decoding the desired frame with a decode time of the current frame and increment the frame count by 1 when the time elapsed is less than the predeterminable threshold time period.

19. The data processing device of claim 18, wherein the processor is configured to render the frames of the video sequence after the predeterminable threshold time period at the lower frame rate based on:
   adaptively calculating a number of frames to skip without rendering thereof from the time spent in decoding the desired frame,
   determining a number of frames to skip without rendering thereof as a maximum of the adaptively calculated number of frames to skip and the frame count corresponding to the frame rate of the video sequence,
   setting a skip frame count to the determined number of frames to skip,
   decoding the frames of the video sequence after the predeterminable threshold period,
   rendering a decoded frame when a timestamp of the decoded frame corresponds to a time that is more than the desired point in time, followed by termination of the seeking,
   rendering the decoded frame along with setting the skip frame count as 0 when the timestamp of the decoded frame corresponds to a time that is less than the desired point in time, and
   skipping the decoded frame without rendering and moving onto decoding a next frame when the skip frame count is less than the determined number of frames to skip.

20. The data processing device of claim 15, further comprising a multimedia framework implemented therein,
   wherein the multimedia application is configured to transmit an event related to the seeking of the desired frame to the multimedia framework, and
   wherein processes related to the seeking of the desired frame are executed through the multimedia framework, in conjunction with the processor.

* * * * *